United States Patent [19]

Veneziano

[11] 3,774,425
[45] Nov. 27, 1973

[54] PORTABLE SHAPING TOOL
[76] Inventor: Joseph Veneziano, 6517 Arden Rd., Cleveland Heights, Ohio 44142
[22] Filed: Dec. 23, 1971
[21] Appl. No.: 211,594

Related U.S. Application Data
[62] Division of Ser. No. 55,386, July 16, 1970, abandoned.

[52] U.S. Cl. .................. 72/326, 72/332, 83/686
[51] Int. Cl. .......................................... B21d 31/00
[58] Field of Search .................... 113/118 R, 118 A; 72/DIG. 19, 387, 389, 326, 343, 332; 83/686, 690

[56] References Cited
UNITED STATES PATENTS
2,620,879   12/1952   Fechter ........................ 72/326
1,405,045   1/1922   Landis ......................... 72/387

Primary Examiner—Charles W. Lanham
Assistant Examiner—Robert M. Rogers
Attorney—Bosworth, Sessions, Herrstrom & Cain

[57] ABSTRACT

A portable shaping tool for impressing shapes into sheet metal and the like includes frame members hinged together at one end. The frame members are tubular in cross section and are hinged by the insertion of the ends of one frame member into the respective ends of a tube connected to the other frame member. One frame member carries an element for shaping or for shaping and cutting. The other frame member carries a die plate in which the die is an opening through the plate having the proper dimensions to receive the shaping element. A particular application for the tool when a cutting and shaping element is employed is the punching of louvers in aluminum siding.

7 Claims, 6 Drawing Figures

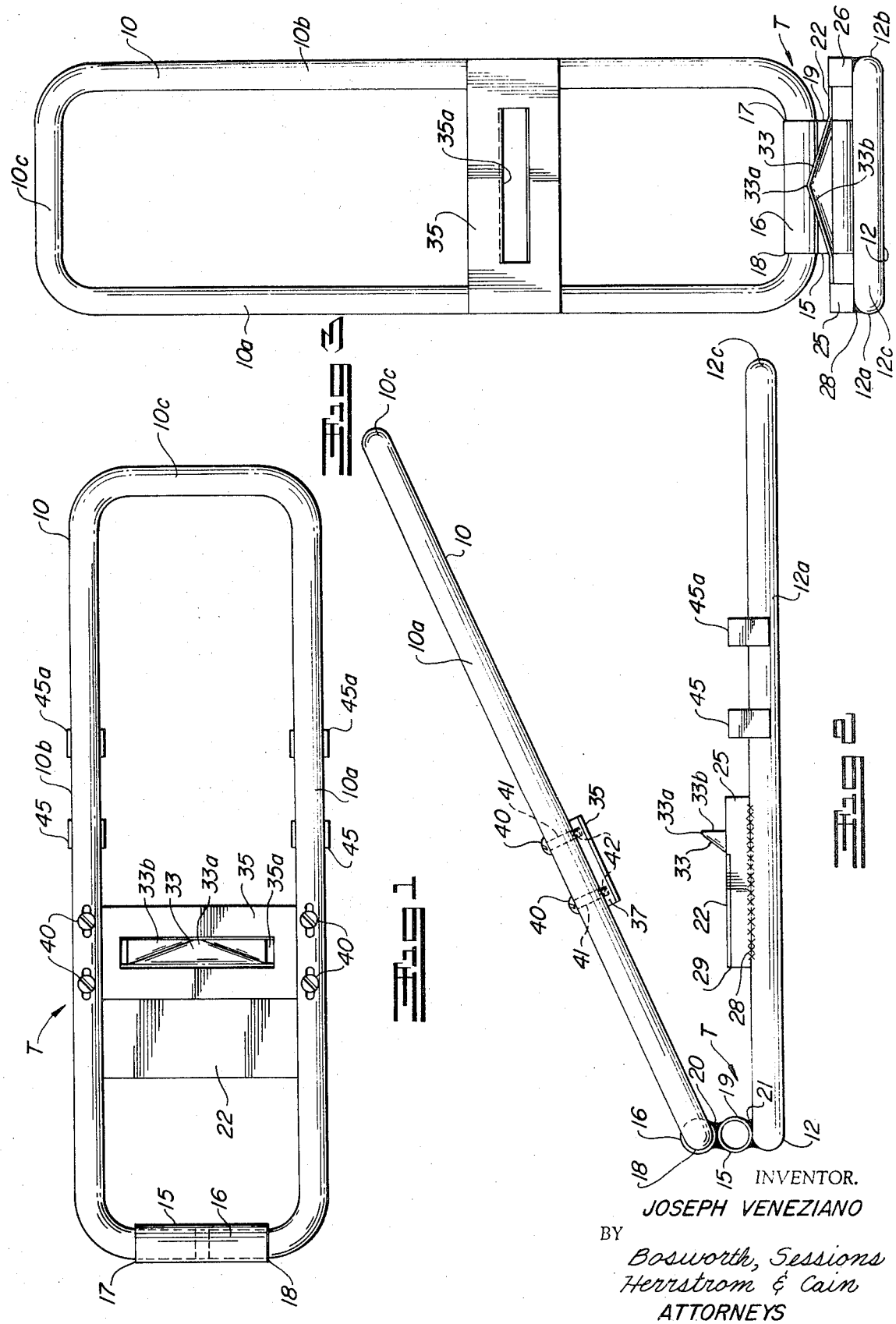

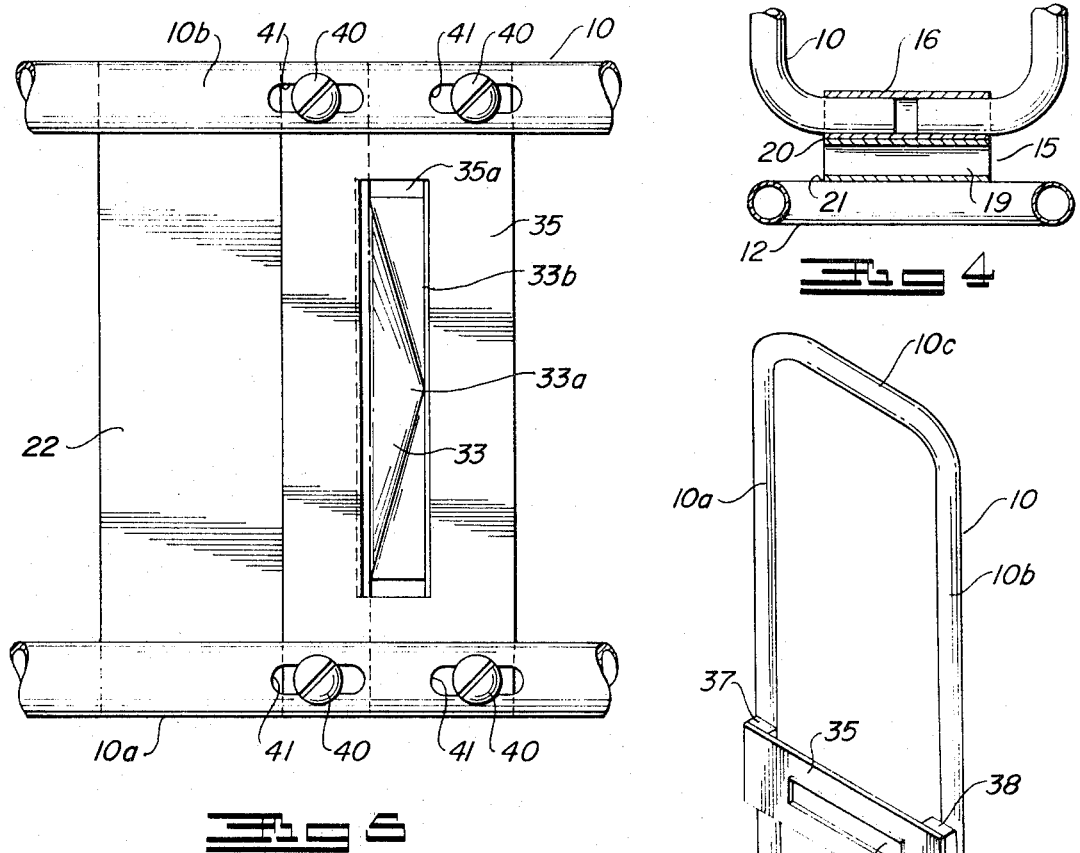
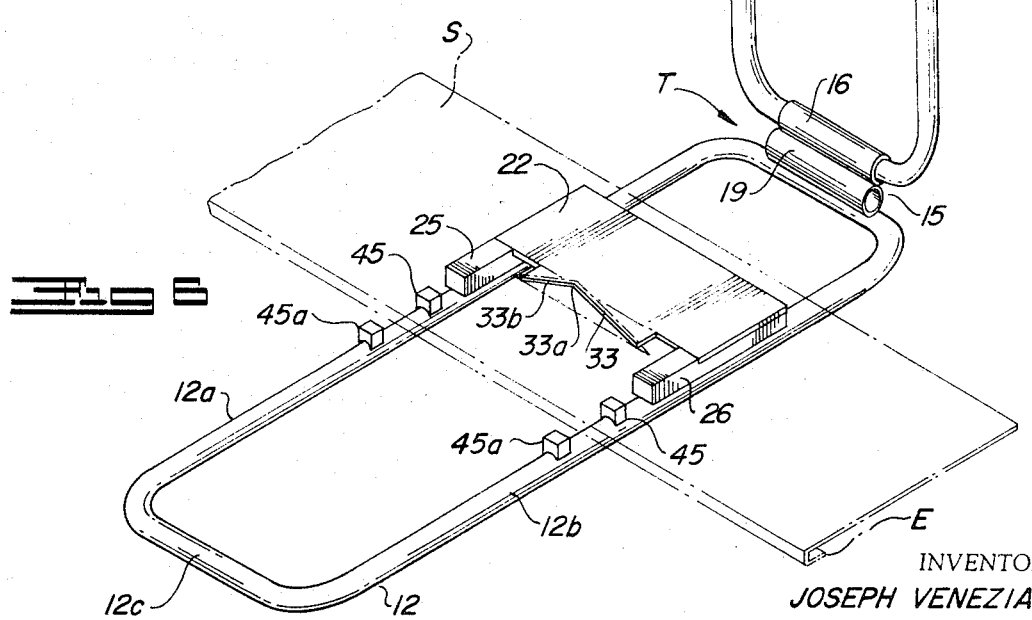

PORTABLE SHAPING TOOL

This is a division of application Ser. No. 55,386, filed July 16, 1970, now abandoned.

BACKGROUND OF THE INVENTION

This invention relates generally to forming or shaping tools and more particularly to portable tools for impressing shapes into sheet metal and the like. In one of its aspects the invention has great utility as a portable punch for forming louvers in aluminum siding and the like.

Portable tools for impressing shapes into sheet metal and the like generally comprise cooperating male and female die parts that correspond in shape to each other and to the shape to be imparted to the workpiece. Such tools of the portable type are generally pivoted about an axis to bring the male and female die parts together to impress a particular shape into the workpiece.

All such tools of which I am aware suffer from various complexities that render them more or less costly and inefficient. One disadvantage is that considerable expense is entailed in making both the male and female die parts to conform to the shape to be impressed in the workpiece. Another disadvantage is that the view of the workpiece is obscured when the cooperating die parts are mated to impress their shape into the workpiece.

Other disadvantages in such tools are in the arrangements for pivoting one die part with respect to the other and in the excessively complex arrangement of their parts generally.

SUMMARY OF THE INVENTION

A general object of this invention is to provide a portable shaping tool that eliminates the complexities noted above in prior shaping tools and that is simple in construction, inexpensive to manufacture and convenient and efficient to use.

Another object is to provide a portable shaping tool having a die plate that is particularly simple in construction and effective in use.

Yet another object of the invention is to provide a portable shaping tool in which the workpiece is visible during the shaping operation.

Still another object is to provide a portable shaping tool having cooperating members that are pivotally connected in a particularly simple and efficient way.

Yet another object of my invention is to provide a portable tool for punching louvers in aluminum siding and the like.

In a preferred form, the portable shaping tool of this invention comprises a base plate having a shaping element projecting therefrom and a die plate having an opening therethrough adapted to receive the shaping element to press a particular shape into a metal sheet inserted between the plates. Means are provided for moving one of the plates with respect to the other to perform the shaping operation.

In its further aspects, the invention may include a tubular frame member supporting one of the plates and a tube mounted in fixed relation to the other plate. The tubular frame member may have an end that fits into an end of the tube for rotation with respect thereto so that the base plate and the die plate may be moved pivotally toward and away from each other.

The tool becomes a portable louver punch when the shaping element is also a cutting element.

BRIEF DESCRIPTION OF THE DRAWINGS

FIG. 1 is a plan view of my portable shaping tool.

FIG. 2 is a side view of the portable shaping tool with the shaping element and die plate separated.

FIG. 3 is a front view of the shaping tool with the frame members open to an angle of 90° with respect to each other.

FIG. 4 is a detailed longitudinal sectional view of the hinge connection connecting the frame members.

FIG. 5 is a detailed plan view of the shaping element and the die plate in working relation.

FIG. 6 is a perspective view showing a piece of aluminum siding in working position in the tool, a louver having just been punched in the siding.

DESCRIPTION OF THE PREFERRED EMBODIMENTS

Referring now to the drawings and initially to FIGS. 1 to 5, the shaping tool, generally designated T, includes upper and lower tubular frame mmbers 10 and 12, respectively, each shaped generally into a rectangle having rounded corners. The frame members have long arms 10a, 10b and 12a, 12b and short handle portions 10c and 12c. Frame members 10 and 12 are pivotally connected at one end by a hinge arrangement generally designated 15. The hinge includes a tube 16 having a slightly larger diameter than tubular frame members 10 and 12. The ends of frame member 10 extend into the respective ends 17 and 18 of tube 16 and are free to rotate therein with respect to the tube as best seen in FIG. 4. Frame members 10 and 12 as well as tube 16 are preferably made of mild steel although other materials may be employed. A steel pipe section 19 is provided to space the frame members 10 and 12 a desired distance apart at the hinged end of the tool. Pipe section 19 is attached to frame member 12 and to tube 16 preferably by welding as at 20 and 21 in FIG. 2.

A base plate 22 is mounted between the longer arms 12a and 12b of frame member 12 and supported thereon by steel blocks 25 and 26. Steel blocks 25 and 26 are attached on one side to arms 12a and 12b, respectively, of frame member 12 preferably by welding as shown at 28. On their opposite sides the blocks 25 and 26 are attached to base plate 22 also preferably by welding as at 29.

A shaping element 33 which, in this illustrative embodiment, is also a cutting element is attached, preferably by welding, to the front edge of base plate 22 and extends upwardly and forwardly therefrom. The particular cutting and shaping element shown has a centrally located peak 33a at its front edge and tapers from there rearwardly and to each side as can be seen from the drawings. The front edge 33b of the cutting and shaping element is relatively sharp and serves as a cutting or shearing edge in a manner to be described below. Element 33 need not be provided with a cutting edge but may comprise only a shaping element for impressing particular shapes into sheet metal without cutting, and may also be shaped other than as particularly shown in the drawings.

A die plate 35 is mounted between the longer arms 10a and 10b of tubular frame member 10 and is supported thereon and properly spaced therefrom by steel blocks 37 and 38. Blocks 37 and 38 are attached to arms 10a and 10b of frame member 10 by bolts 40 that extend through holes 41 in arms 10a and 10b and into threaded engagement with tapped holes 42 in blocks 37 and 38. Holes 41 in arms 10a and 10b are elongated to allow adjustment of die plate 35 with respect to cutting and shaping element 33. Blocks 37 and 38 are attached to die plate 35 preferably by welding.

Die plate 35 is provided with a central opening 35a adapted to receive cutting and shaping element 33 to form, in the particular embodiment illustrated, a louver. In the embodiment illustrated, the central opening 35a is rectangular and of the proper dimensions to allow cutting and shaping element 33 to be received therein. The relative positions of die plate 35 and cutting and shaping element 33 is very slightly in contact with the forward edge of central opening 35a as the shaping tool is opened or closed. In this way, the shearing edge 33b of the cutting and shaping element 33 and the forward edge of the central opening 35a cooperate to shear a sheet metal workpiece therebetween as will be described more fully below.

In those cases where element 33 is a shaping element only, it will not be provided with a cutting or shearing edge and the shape and dimensions of the central opening 35a in die plate 35 will vary in accordance with the form of the shaping element.

Set blocks 45, and 45a, preferably of hard rubber, may be fitted onto frame member 12 by means of open circular portions that substantially, but not completely, encircle the tubular arms 12a. The set blocks assist in properly positioning a sheet metal workpiece in the tool.

FIG. 6 illustrates the portable shaping tool as used for punching louvers in aluminum siding. The shaping tool is of particular benefit in this application. Aluminum siding is normally sold in sections of standard dimension. Standard sections are available having louvers prepunched therein. At the siding installation site, however, the sections very often must be trimmed to particular dimensions according to the size and location of the house louvers which are to be covered with siding. In the course of custom trimming the louvered siding sections it is often found that the location and spacing of the prepunched louvers causes the custom trimming to be quite difficult and time consuming if the siding is to present a pleasing appearance at the louvered portion.

With a portable louver punch, however, conventional unlouvered siding sections can be trimmed to fit the louvered portion of the house precisely, and then louvers can be punched in the custom trimmed sections at the most appropriate locations and spacings to provide a pleasing appearance without the expenditure of added time and effort.

To use the portable shaping tool as a louver punch, frame member 10 is pivoted away from frame member 12 and the siding S to be punched is positioned on base plate 22 so that the spot where a louver is desired is positioned over cutting and shaping element 33. If a series of horizontally spaced louvers is to be punched, the set blocks 45 may be positioned at the appropriate locations on the arms of frame member 12 so that the louver inside edge E of the siding section S is butted against the blocks. Siding section S can then be moved horizontally appropriate distances while maintaining contact with the blocks. Louvers punched at appropriate locations will then be aligned horizontally. For punching vertically aligned louvers set blocks 45a may be positioned the appropriate distance from set blocks 45 corresponding to the desired vertical distance between the louvers. Siding section S may then be positioned so that edge E abuts blocks 45a to allow one louver to be punched and may then be positioned to abut blocks 45 to allow a vertically aligned louver to be punched.

For the actual punching operation frame member 10 is grasped by its handle portion 10c and pivoted toward frame member 12 to bring die plate 35 into contact with the siding to be punched. A further application of force will cause the opening 35a in die plate 35 to descend over cutting and shaping element 33 impressing the shape of the cutting and shaping element into the aluminum siding and shearing the siding along shearing edge 33b. Frame member 10 is then pivoted away from frame member 12 to disengage die plate 35 from cutting and shaping element 33. At that point, the newly punched louver is formed around cutting and shaping element 33 as shown in FIG. 6. The siding section may then be lifted off base plate 22 and repositioned to allow another louver to be punched in the manner just described.

During the entire punching operation the workpiece was in view so that correction could be made in the force applied if desirable. The particularly simple construction of die plate 35 allows observation of the louver even as it is being formed.

It will be apparent to those skilled in the art that my portable shaping tool has several advantages. The particularly simple form of die plate eliminates the necessity for having a mold or female die that conforms to the shape of the male die or to the shape to be imparted to a metal sheet. Further, the progress of the shaping or puncbing operation may be observed continuously because of the nature of the die. The die may be used with any form of shaping element or with any form of cutting and shaping element merely by varying its dimensions in accordance with the characteristics of the shaping element.

Other advantages are in the strength and light weight of the shaping tool which employs tubular frame members for strength and light weight and in the uniquely simple hinge arrangement whicn takes maximum advantage of the tubular shape of the frame members to produce a pivotal or hinging connection that is extremely simple, reliable and inexpensive.

While I have described a preferred form and embodiment of my invention, changes and improvements will occur to those skilled in the art who come to understand its essential principles and accomplishments. I do not, therefore, wish to be confined to the specific form of my invention herein specifically disclosed nor in any other way inconsistent with the progress by which my invention has promoted the art.

I claim:

1. A portable louver punch comprising a base plate having a cutting and shaping element projecting therefrom, a die plate having an opening therethrough adapted to receive said cutting and shaping element to form a louver therewith, said opening having no wall that limits the extent of penetration of said cutting and shaping element therein, and a frame member supporting one of said plates for pivotal movement toward and away from the other of said plates.

2. The punch as claimed in claim 1 further comprising means for varying the linear position of one of said plates with respect to the other of said plates.

3. The punch as claimed in claim 1 wherein said base plate is mounted on a first frame member, said die plate is mounted on a second frame member, said frame members being pivotally connected at one end whereby one of said plates may be moved pivotally poward and away from the other of said plates.

4. The punch as claimed in claim 3 further comprising adjustable setting means mounted on a member for positioning sheet metal to be punched between said plates.

5. A portable louver punch comprising a base plate having a cutting and shaping element projecting therefrom, a die plate having an opening therein adapted to receive said cutting and shaping element to form a louver therewith, and a frame member supporting one of said plates for pivotal movement toward and away from the other of said plates, said frame member being hinged for pivotal movement, said hinge including a tube mounted in fixed relation to one of said plates, said frame member supporting the other of said plates and including a tubular member having an end fitting into each end of said tube for rotation with respect thereto, whereby one of said plates may be moved pivotally toward and away from the other of said plates.

6. A portable louver punch comprising a first frame member, a base plate mounted on said first frame member, said base plate having a cutting and shaping element projecting therefrom, a second frame member, a die plate mounted on said second frame member, said die plate having an opening therein adapted to receive said cutting and shaping element to form a louver therewith, said frame members being pivotally connected at one end whereby one of said plates may be moved pivotally toward and away from the other of said plates, said frame members including tubular members, said pivotal connection comprising a tube mounted on one of said frame members, the other of said frame members having an end fitting into each end of said tube for rotation with respect thereto.

7. The punch as claimed in claim 1 wherein said die plate is thin in comparison with the dimension of said cutting and shaping element in the direction of its penetration of said opening, whereby said cutting and shaping element extends through and beyond said die plate.

* * * * *

PO-1050
(5/69)

UNITED STATES PATENT OFFICE
CERTIFICATE OF CORRECTION

Patent No. 3,774,425      Dated November 27, 1973

Inventor(s) Joseph Veneziano

It is certified that error appears in the above-identified patent and that said Letters Patent are hereby corrected as shown below:

Change the city of patentee's residence from "Cleveland Heights, Ohio" to --Brook Park, Ohio--.

Column 2, line 21 correct the spelling of --members--.

Column 4, line 34 correct the spelling of --punching--.

Column 4, line 43 correct the spelling of --which--.

Signed and sealed this 4th day of June 1974.

(SEAL)
Attest:

EDWARD M. FLETCHER, JR.
Attesting Officer

C. MARSHALL DANN
Commissioner of Patents